April 14, 1959

E. FRISCH 2,882,428

LINEAR MOTION DEVICE

Filed Feb. 15, 1957

INVENTOR
Erling Frisch

BY
Arthur T. Stratton
ATTORNEY

April 14, 1959

E. FRISCH 2,882,428

LINEAR MOTION DEVICE

Filed Feb. 15, 1957

\# United States Patent Office 2,882,428
Patented Apr. 14, 1959

2,882,428

LINEAR MOTION DEVICE

Erling Frisch, Pittsburgh, Pa., assignor to Westinghouse Electric Corporation, East Pittsburgh, Pa., a corporation of Pennsylvania Application February 15, 1957, Serial No. 640,501

18 Claims. (Cl. 310—83)

The present invention relates to a linear motion device and more particularly to a device of this nature adapted for quickly engaging and disengaing the linear element driven thereby.

Prior linear motion devices of the character described frequently employed a plurality of pivoted arms having driving means secured to an end theerof and having their other ends forming the salient poles of the rotor of the device. In these arrangements, the other ends of the pivoted arms extended under the stator of the device and when the stator was energized, the arms were pivoted outwardly in order to engage the aforesaid driving means with the linear element. In these arrangements, since the pivoted arms additionally formed the salient poles of the rotor, the number thereof was limited to an even number of pivoted arms, for an example four, thereby increasing in some cases the complexity of the device. Moreover, since the salient poles of the rotor were movable, the structure of the rotor itself not only was complicated thereby but in addition the magnetic circuit thereof frequently was distorted or impaired. As a result, a larger or longer rotor for the linear motion device was required than otherwise would be the case.

On the other hand, the pivoted arms and the driving means secured at the other end thereof, being positioned by the magnetic attraction of the stator, had to be provided with a greater size in order to provide sufficient engaging force between the driving means and the linear element being driven thereby. For the same reason, in these prior devices, the portion of the pivoted arms extending under the stator was increased in length not only to encompass the frequently added length of the rotor but also to provide sufficient leverage which, in conjunction with the magnetic attraction of the stator, provided sufficient engaging force of the aforesaid driving means. Thus the length of the pivoted arms and the necessarily increased sizes, respectively, of the stator and rotor unduly increased the length and diameter of prior forms of these linear motion devices. As a result, the construction of the devices was complicated and expensive.

In view of the foregoing, it is an object of the invention to provide a novel and efficient linear motion device.

Another object of the invention is to improve the magnetic circuit of the rotor of such device and thereby to decrease the size thereof.

A further object of the invention is to provide a linear motion device having novel and efficient means for quickly engaging and disengaging the driving mechanism thereof, which means requires a minimum of space and component parts.

Still another object of the invention is to provide a linear motion device wherein the number of driving means utilized therein is not dependent upon the number of rotor poles.

Yet other objects of the invention are to reduce the size, complexity, and cost of linear motion devices and to provide means for ensuring the desired engagement of the driving means of the device with the linear element driven thereby.

These and other objects, features, and advantages of the invention will be made apparent during the ensuing description of illustrative forms of the invention, with the description being taken in conjunction with the accompanying drawings, wherein.

In accordance with the invention, the individual driving means of the linear motion device are mounted upon comparatively short pivoted arms and arranged for engagement with a linear element for driving the same. A latching or control mechanism is provided with suitable means for engaging the pivoted arms in a manner such that a minimum of force is required to engage and to disengage the driving means relative to the linear element, and further means are provided for conveniently manipulating the aforesaid control mechanism. In one arrangement of the invention the control mechanism is disposed such that only minimal force need be exerted thereby to hold the driving means in the driving position thereof and that the mechanism is urged to one of the engaging and disengaging positions, as desired, of the driving means upon failure of power or some other contingency.

Figure 1:
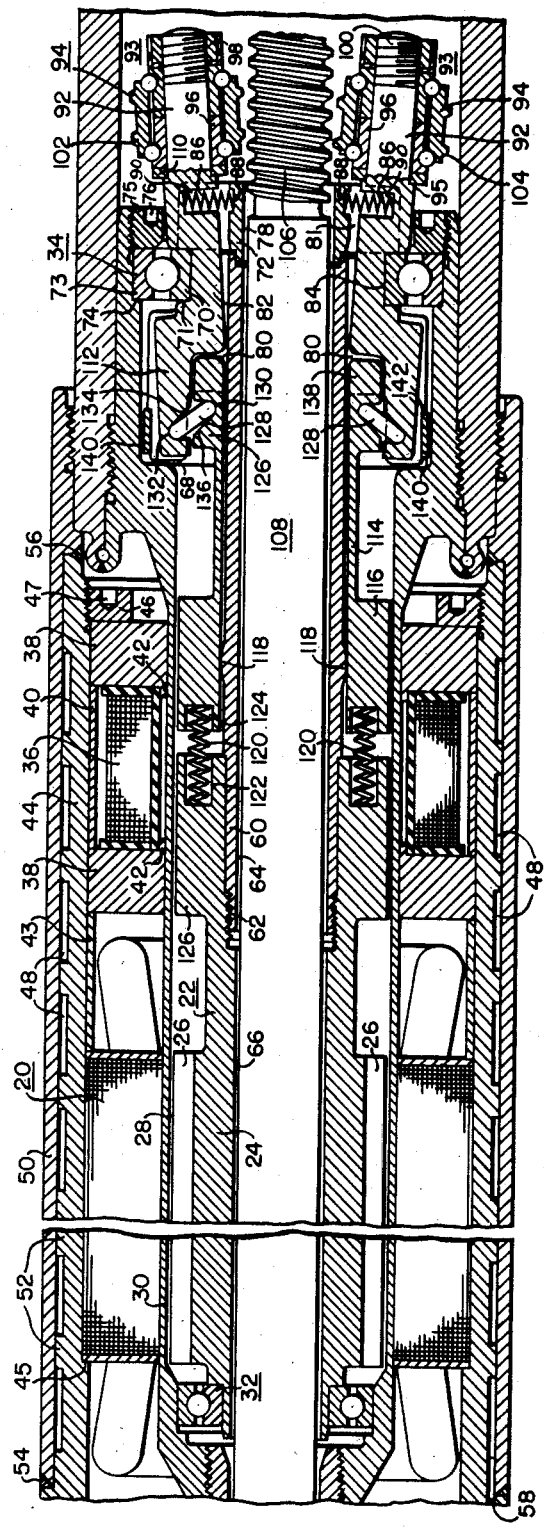
Figure 1 is a longitudinal sectional view of one form of linear motion device constructed in accordance with the invention and taken along reference lines I—I of Fig. 5.

Referring now more particularly to the drawings, the illustrative form of the invention shown therein comprises the stator 20 and an elongated rotor structure indicated generally by the reference character 22. A portion 24 of the rotor structure is extended under the stator 20 and is provided with a number of grooves 26, which serve to divide the portion 24 of the rotor structure into a plurality of salient poles 28, with eight being formed in this example of the invention. In this arrangement, the linear motion device is adapted for operation within a sealed system and thus the rotor 22 is enclosed within a sealed tubular casing 30 fabricated from a magnetic material, for example magnetic stainless steel. The rotor 22 likewise is formed at least partially from a magnetic material and is supported for rotation within the tubular casing 30 by suitable antifrictional means, for example ball-bearing arrangements 32 and 34, which are disposed respectively adjacent the extremities of the rotor structure 22. Since the linear motion device illustrated in Fig. 1 is employed in a sealed system, in this application of the invention, a windingless rotor, such as the salient pole rotor described herein, or, alternatively, a squirrel-cage type rotor (not shown), is employed. In other applications of the rotor of the linear motion device, particularly when not employed in a sealed system, the rotor structure 22 may be provided with suitable windings (not shown) for either alternating or direct-current operation, as desired.

Adjacent one end of the stator 20 and surrounding the rotor structure 22 is disposed a direct-current electromagnetic coil 36 or other suitable means for operating a control mechanism presently to be described. The coil 36 is supported between a pair of heavy end washers 38 fabricated from a magnetic material and engaging the tubular casing 30. The magnetic washers 38 are spaced from one another by an annular tubular member 40 likewise formed from a magnetic material and which, in conjunction with the washers 38 and an outer housing member 44, forms a low reluctance path for the external magnetic flux of the electromagnetic coil 36. The latter coil is positioned axially of the washers 38 by means of flanges 42 formed integrally with the washers 38 and disposed respectively adjacent the inner peripheries thereof.

The electromagnetic coil 36 and the stator 20 are mounted substantially coaxially along the length of the tubular casing 30, but are spaced from one another through the intervention of an annular spacer 43. The stator 20 and the coil 36 with the spacer 43 therebetween are inserted into the lower end of the outer casing section 44 and positioned by the engagement of the stator 20 with an annular shoulder 45 formed on the inner periphery of the outer housing member 44. The stator 20 and the coil 36 are secured in this position by an annular nut 46 threadedly secured into the adjacent end of the housing member 44 and engaging the outward one of the pair of washers 38. The annular nut 46 is desirably provided with a plurality of indents 47 suitably spaced around the outward end face thereof for the insertion of an appropriate tool adapted for turning and manipulating the annular nut 46.

The outer housing member 44 is provided on the outer surface thereof with communicating coolant passages 48 which extend substantially the entire combined length of the stator 20 and the coil 36 in order to dissipate heat formed in the coil and stator. The passages 48 are enclosed between the outer housing member 44 and a shroud tube 50 shrunk-fitted thereon and engaging raised portions 52 which segregate the passages 48. The shroud tube 50, in this example, is hermetically sealed to the outer housing member 44 adjacent the ends thereof by annular sealing welds 54 and 56, respectively. A suitable coolant is introduced into the passages 48 by way of an inlet coolant conduit 58 at the upper end, and is exited from the passages by a suitable outlet conduit (not shown).

Figure 6:
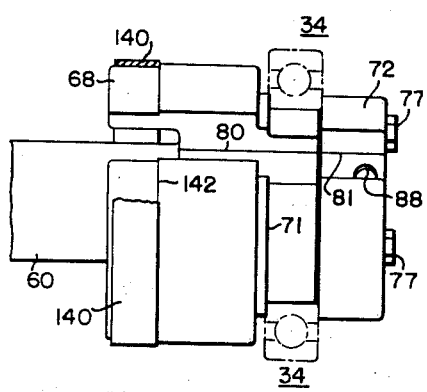
Fig. 6 is a partial view of the end structure of the rotor illustrated in Fig. 1, with parts having been removed and other parts sectioned for purposes of clarity.

The aforementioned rotor structure 22 includes a tubular extension 60, which is rigidly secured to the rotor structure, as by threading, where indicated by the reference character 62, such that the hollow center 64 of the tubular extension is aligned with a central cavity 66 extending longitudinally through the rotor portion 24. At least that portion of the extension 60 which lies adjacent the coil 36 is formed from a non-magnetic material in order to prevent distortion of the magnetic circuit of the coil. Secured to the outward end of the tubular extension 60, as by being formed integrally or by shrink-fitting, is a cup-shaped member 68, illustrated more fully in Fig. 6 of the drawings. An inner race member 70 of the aforementioned ball bearing 34 is secured at an end of the cup-shaped member 68 and is positioned thereat between an annular shoulder 71 formed adjacent the aforesaid cup-shaped member and an end annular retaining member 72. An outer race member 73 of the ball bearing 34 similarly is clamped between an annular shoulder 74 provided on the inner periphery of the tubular casing 30 and a nut 75 threadedly secured to the casing 30 and inserted into the adjacent end thereof. The nut 75 is provided with a plurality of holes 76 for manipulation of the nut 75 as described heretofore in connection with the stator retaining nut 46.

The annular retaining member 72 is secured endwise to the cup-shaped member 68 in clamping relationship with the inner race 70 of the ball bearing 34 by means of a number of mounting bolts 77 inserted through suitable apertures in the retaining member and threaded into suitable tapped holes of the cup-shaped members 68. Additionally, the retaining member 72 is provided with a central aperture 78 which is disposed in alignment with the channel 66 of the rotor portion 24 and the hollow center 64 of the tubular rotor extension 60, for purposes hereinafter to be elaborated upon.

The cup-shaped rotor member 68 is provided at its circumferential periphery with a plurality of longitudinally extending grooves 80. In this example of the invention, three such grooves 80 are employed and each of the grooves is substantially rectangular in cross section. The retaining member 72 is provided with complementary grooves 81 disposed in alignment with the grooves 80, respectively, of the cup-shaped member 68. Disposed in each one of the grooves 80 is a pivoted arm 82 provided with a notch 84 at the outward side thereof approximately centrally of the arm 82. Each of the arms 82 is pivoted about the inner race member 70 of the ball bearing 34 such that the inner race member seats within the notch 84 formed in each of the pivoted arms. Each of the pivoted arms 82 fits comparatively loosely within the grooves 80 and 81 of the aforesaid cup-shaped member and retaining member, respectively, with the result that the arm 82 is free to move within the grooves 80 and 81 in pivotal relationship with the inner race member 70. In furtherance of this purpose, each pivoted arm 82 is held in engagement with the inner race member by means presently to be described and by means of a compressed biasing spring 86 seated in a notch 88 formed in the bottom wall of the complementary groove 81 of the retaining member 72. The biasing springs 86 thence extend into recesses 90 formed on the inward surfaces of the pivoted arms 82, respectively. The arms 82, therefore, are not only pivoted about the inner race member 70, but additionally by their constant engagement with the inner race member provide an antifrictional mounting for the associated end of the rotor structure 22.

Figure 2:
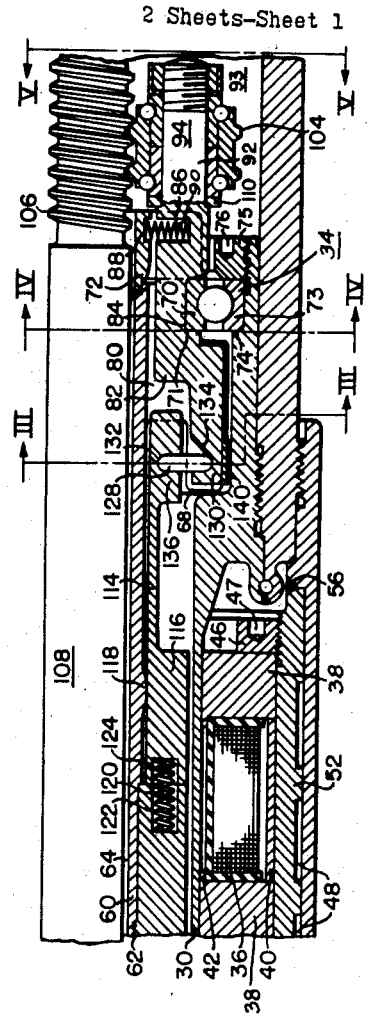
Fig. 2 is a longitudinal sectional, partial view of the linear motion device of Fig. 1 likewise taken substantially along reference lines I—I of Fig. 5, but showing the driving means of the linear motion device in their engaged positions.

Each of the pivoted arms 82 terminates at the outward end thereof in a stub shaft 92 formed integrally with the associated pivoted arm and adapted to support thereon a coupling means adapted for driving engagement with a linear element 108 and indicated generally by the reference character 93. One form of such coupling means includes a number of antifrictional bearing arrangements 94. Positioned against a shoulder 95 adjacent each of the stub shafts 92, each antifrictional bearing 94 comprises an inner bearing race 96, which is secured by a nut 98 threadedly engaging an outer threaded portion 100 of the associated stub shaft. An outer bearing race 102 of the bearing 94 is formed with a pair of circular threads 104 arranged in this example to engage the pitched threads 106 formed on the outer periphery of the linearly moving element 108. Each of the pivoted arms 82 and the associated coupling means 93, arranged on the outward end thereof, is angled slightly such that the circular threads 104 of the driving means are substantially parallel to the pitch of the screw thread 106. Accordingly, when the coupling means 93 are engaged with the screw thread 106 of the linear element, as illustrated in Fig. 2 of the drawings, the rotation of the rotor structure 22, upon energization of the stator 20, causes the coupling means 93 to revolve around the linear element 108, thereby forcing the linear element 108 to move axially thereof through the aforementioned central cavity of the rotor structure 22, which cavity is represented by the channel 66 of the rotor portion 24, the interior 64 of the rotor extension 60, and the central aperture 78 of the retaining member 72. Rotation of the linear element 108 is prevented, when thus engaged by the coupling means 93, for example by a suitable, known keying arrangement (not shown), such as that described in United States Patent No. 2,780,740 issued February 5, 1957 to W. G. Roman, et al. and assigned to the assignee of the present application.

One or more of the coupling means 93 are provided desirably with a positioning washer 110, which is inserted between the shoulder 95 of the associated pivoted arm and the inner bearing race 96 of the driving means, in order to position the coupling means axially along the length of its stub shaft 92. Thus, a variation in position among the coupling means 93 relative to their respective pivoted arms is secured, which variation is frequently necessary in order to accommodate each coupling means to longitudinal positional variations occasioned by the pitch of the screw thread 106. Obviously, the thickness of each of the washers 110 will be determined by the pitch of the thread 106 and the angular separation between adjacent coupling means 93.

In order to disengage and to engage the coupling means 93 relative to the linearly moving element 108, as represented respectively by Figs. 1 and 2 of the drawings, means are provided for simultaneously moving all of the coupling means 93 and their associated pivoted arms 82, about the inner race member 70 of the ball bearing 34. Such means are associated desirably with the inward ends 112 of the pivoted arms 82 in order to move these ends outwardly to cause the coupling means 93 to engage the linear element, or inwardly to disengage the aforesaid driving means.

Figure 3:
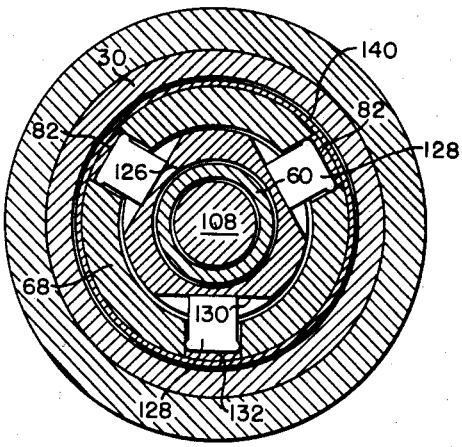
Fig. 3 is a cross-sectional view of the linear motion device of Fig. 1, taken along reference lines III—III thereof.
Figure 4:
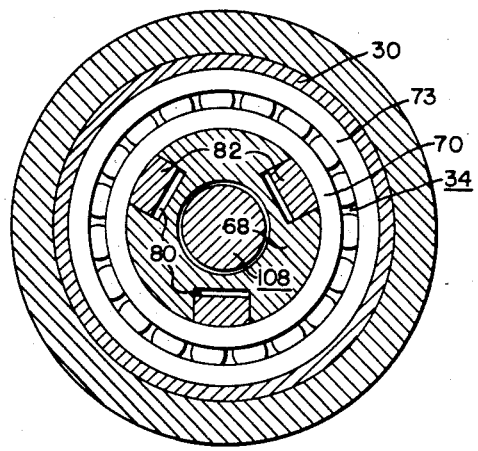
Fig. 4 is another cross-sectional view of the linear motion device of Fig. 1, taken along reference lines IV—IV thereof.
Figure 5:
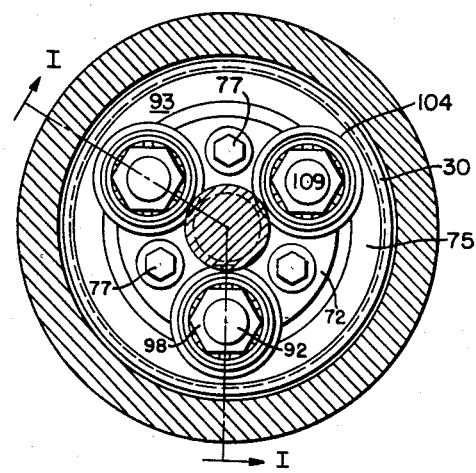
Fig. 5 is an end elevational view partially in section of the driving means of Fig. 1 taken along reference lines V—V thereof.

As shown in Figs. 1, 2 and 3 of the drawings, one arrangement for so manipulating the coupling means 93 includes the biasing springs 86 described heretofore, a slidably mounted control member or slidable sleeve 114 and the electromagnetic coil 36 likewise described more fully heretofore. The control member or sleeve 114 terminates, at the inward end thereof which end is adjacent the coil 36, in a thickened armature portion 116 fabricated from a magnetic material, which thus is disposed in the magnetic field of the coil 36. The sleeve 114 forms a relatively loose or sliding fit with the outer surface of the tubular rotor extension 60 and is substantially evenly spaced therefrom by the employment of a number of a slight annular protuberance 118 formed on the rotor extension. The annular protuberance is disposed adjacent the armature end of the sleeve 114 in order to position the armature portion 116 thereof axially of the coil 36. The other end of the sleeve is permitted limited movement relative to the rotor extension 60 in order to compensate for slight differences occasioned by manufacturing tolerances in the pivoted arms 82 and the pivot or link members 128 presently to be described.

Upon energizing the electromagnetic coil 36, the armature sleeve 114 is drawn leftwardly by the magnetic field of the coil 36 against the action of a plurality of compressed biasing springs 120, with three being utilized in this application of the invention. Each of the springs 120 are inserted into complementary cavities 122 and 124 formed respectively in a thickened rotor portion 126 and in the armature end portion 116 of the sleeve 114. In those applications wherein it is important to disconnect the coupling means 93 from the linear element 108 in order to free the linear element for rapid movement thereof by gravity or by other suitable means to a predetermined position, in the advent of power failure or other contingency, the biasing springs 120 are arranged to move the sleeve 114 in such a direction that the sleeve by means presently to be described operates to disengage the coupling means 93 from the linear element 108.

As better shown in Fig. 1 of the drawings, when the electromagnetic coil 36 is deenergized the biasing springs 120 operate to move the sleeve 114 rightwardly in order to pivot the arms 82, through a suitable linkage, to their inoperable position. One form of such linkage includes a collar portion 126 formed integrally adjacent the outward end of the slidable sleeve 114 and a plurality of flat pivot members 128 which are equal in number to that of the pivoted arms 82. Each of the pivot members 128 are more or less freely mounted with the inward end thereof being seated individually in a like number of circumferentially positioned indents 130 formed in the aforesaid thickened collar portion 126 and with the outward end thereof inserted in an opposing or inwardly disposed indent 132 formed adjacent the inward end 112 of each pivoted arm 82. Thus each pivot member 128 is positioned between the associated pair of indents 130 and 132, and lateral movement of each pivot member is prevented by the side walls of the longitudinal grooves 80 provided in the cup-shaped member 68 and into which the pivoted arms 82 are inserted individually. When the sleeve 114 is moved outwardly, or toward the pivoted arms 82, by the biasing springs 120, the ends of each pivot member 128, which are rounded for this purpose, rotate slightly relative to, or pivot at, the rounded bottom walls of the associated indents 130 and 132, such that the flat pivot member 128 is inclined or tilted in order to permit inward movement of the pivoted arm end 112 toward the sleeve 114 under impetus of the biasing spring 86. As shown in Fig. 1 of the drawings, such movement of the pivoted arms disengages each of the coupling means 93 from the linear element 108. In order to facilitate the aforementioned tilting or inclination of the pivot member 128, the indents 130 and 132 are each formed with an inclined side wall 134 or 136, respectively.

As shown more fully in Fig. 2 of the drawings, when the electromagnetic coil 36 is energized and the sleeve 114 is attracted leftwardly against the action of the biasing springs 120, the pivot members 128 are rotated to their erected positions by movement of the collar portion 126 and the associated notches 130 relative to the notches 132 of the pivoted arms, respectively. In this latter position of the sleeve 114, the pivot members 128 are disposed substantially perpendicularly to the pivoted arms 82 and the slidable sleeve, and the inward ends 112 of the arms have been moved thereby to their outermost positions whereat the coupling means 93 are engaged with the linear element 108. With this arrangement, as long as the sleeve 114 is attracted to the left, or away from the pivoted arms 82, by energizing the electromagnet 36, a positive mechanical coupling represented by the pivot members 128 forces the coupling means 93 into engagement with the linear element 108. This coupling obviously does not depend upon the strength of the electromagnetic coil 36 so long as the latter is sufficiently strong to overcome the action of the biasing springs 120 when energized. This follows from the fact that when the pivot members 128 are erected, or disposed transversely of the movable sleeve 114, as shown in Fig. 2 of the drawings, virtually no longitudinal force can be transmitted through the pivot members 128 to the sleeve 114 by the biasing springs 86 or by camming action of the linear element threads 106 with the circular threads 104 of the coupling means particularly in those applications wherein the linear element 108 is supported for vertical movement and the weight thereof is borne by the aforementioned coupling means.

The slidable sleeve 114 is further provided with a plurality of desirably rectangular projections 138, which are equal in number to that of the grooves 80 of the cup-shaped member 68 and which are extendable to form a relatively loose fit therein. The length of the projections 138 are selected such that throughout the extent of travel of the sleeve 114, at least a portion of each projection 138 extends at all times within the associated slot 80 in order to prevent rotation of the sleeve 114 relative to the cup-shaped member 68 which is rigidly secured to the rotor structure 22. Consequently, the alignment of the complementary biasing spring recesses 122 and 124 is ensured and relative circumferential movement which would otherwise be imparted to the pivot members 128 is avoided. The outward movement of each of the pivoted arm ends 112 is limited by an annular band 140 in order to prevent accidental engagement of the rotating ends 112 with the adjacent inner peripheral portion of the tubular casing 30. In one arrangement of the invention, the band 140 is shrunk fitted upon the outer surface of the cup-shaped member 68 adjacent the inward end thereof and is positioned thereat by a shoulder 142.

From the foregoing disclosure, it will be apparent that a novel and efficient arrangement of a linear motion device has been presented herein. The device is arranged such that the size and number of its component parts are minimized and that the driving means associated therewith can be quickly and easily engaged or disengaged relative to the linear element being driven.

Inasmuch as the foregoing description and illustrations of the invention are exemplary in nature, numerous modifications will occur to those skilled in the art without departing from the scope of the appended claims. Moreover, it is to be understood that certain features of the invention can be employed without a corresponding use of other features.

I claim as my invention:

1. A linear dynamoelectric machine comprising a supporting member, a stator mounted on said supporting member, an elongated tubular rotor mounted for rotational movement on said supporting member at a position adjacent said stator, said rotor having a channel extending therethrough and adapted for the insertion of a linear element, a plurality of arms pivotally mounted on said rotor adjacent an end thereof, coupling means disposed on the outward end of each said arms and arranged for driving engagement with said linear element, a control member slidably mounted on said rotor, means for moving said control member, and additional means coupled to the other ends of each said pivoted arms and to said control member for controlling the engagement and disengagement of said coupling means with said linear element upon movement of said control member.

2. A linear dynamoelectric machine comprising a supporting member, a stator mounted on said supporting member, a tubular rotor mounted for rotational movement on said supporting member at a position adjacent said stator, a plurality of arms, means for pivotally mounting said arms on said rotor for rotational movement therewith, coupling means disposed on one end of each of said pivoted arms for drivingly engaging a linearly moving element, a control member slidably mounted on said rotor and joined to the other ends of said pivoted arms through a movable link, said link being tiltable to effect movement of said arms, means for moving said control member to control said tilting and thereby the engagement and disengagement of said coupling means relative to said linear element, and biasing means for urging said pivoted arms to one of said positions of engagement and disengagement of said coupling means.

3. A linear dynamoelectric machine comprising a supporting member, a stator mounted on said supporting member, a tubular rotor mounted for rotational movement on said supporting member at a position adjacent said stator, a plurality of arms, means for pivotally mounting said arms on said rotor for rotational movement therewith, coupling means disposed on one end of each of said pivoted arms for drivingly engaging a linearly moving element, a control member slidably mounted on said rotor and joined to the other ends of said pivoted arms through a movable link, said link being tiltable to effect movement of said arms, means for moving said control member to control said tilting and thereby the engagement and disengagement of coupling means relative to said linear element, and biasing means for urging said pivoted arms to one of said positions of engagement and disengagement of said coupling means and for urging said control member to a position corresponding to said one position.

4. A linear dynamoelectric machine comprising a supporting member, a stator mounted on said supporting member, a tubular rotor mounted for rotational movement on said supporting member at a position adjacent said stator, a plurality of arms, means for pivotally mounting said arms on said rotor for rotational movement therewith, coupling means disposed on one end of each of said pivoted arms for drivingly engaging a linearly moving element, a control member slidably mounted on said rotor, means joined to said control member and to the other ends of said pivoted arms for pivoting said arms to a position corresponding to a first position of said control member whereat said coupling means are engaged with said linear element and for pivoting said arms to a position corresponding to a second position of said control member whereat said coupling means are disengaged from said linear element, and means for moving said control member to said first and said second positions.

5. A linear dynamoelectric machine comprising a supporting member, a stator mounted on said supporting member, an elongated generally tubular rotor mounted for rotational movement on said supporting member at a position adjacent said stator, a plurality of arms, said arms each being pivotally mounted in a longitudinally extending slot formed in said rotor, said rotor having a channel formed therethrough adapted for the insertion of a linear element, coupling means secured to each of said pivoted arms adjacent one end thereof and arranged for driving engagement with said linear element, a generally tubular sleeve slidably mounted on said rotor, means joined to said sleeve and to the other ends of said pivoted arms for pivoting said arms to a position corresponding to a first position of said sleeve whereat said coupling means are engaged with said linear element and for pivoting said arms to a position corresponding to a second position of said sleeve whereat said coupling means are disengaged from said linear element, and means for moving said sleeve to said first and said second positions.

6. A linear dynamoelectric machine comprising a supporting member, a stator mounted on said supporting member, an elongated tubular rotor mounted for rotational movement on said supporting member at a position adjacent said stator, a plurality of arms, said arms each being pivotally mounted in a longitudinally extending slot formed in said rotor, said rotor having a channel formed therethrough and adapted for the insertion of a linear element, coupling means secured to each of said pivoted arms adjacent one end thereof and arranged for driving engagement with said linear element, a generally tubular sleeve slidably mounted on said rotor, means joined to said sleeve and to the other ends of said pivoted arms for pivoting said arms to a position corresponding to a first position of said sleeve whereat said coupling means are engaged with said linear element and for pivoting said arms to a position corresponding to a second position of said sleeve whereat said coupling means are disengaged from said linear element, and means for moving said sleeve to one of said first and said second positions and biasing means for urging said sleeve to the other of said first and second positions.

7. A linear dynamoelectric machine comprising a supporting member, a stator mounted on said supporting member, a tubular rotor mounted for rotational movement on said supporting member at a position adjacent said stator, a channel formed through said rotor and adapted for the insertion of a linearly moving element therethrough, a generally tubular rotor extension secured to said rotor in alignment with said channel, a plurality of arms pivotally mounted on said extension for rotational movement therewith, coupling means secured to the outward ends of said pivoted arms for drivingly engaging said linear element, a generally tubular sleeve slideably mounted on said rotor extension, means for moving said sleeve, and means connected to said sleeve and to the other ends of said pivoted arms for controlling the engagement and disengagement of said coupling means relative to said linearly moving element upon movement of said sleeve.

8. A linear dynamoelectric machine comprising a supporting member, a stator mounted on said supporting member, an elongated generally tubular rotor mounted for rotational movement on said supporting member at a position adjacent said stator, a plurality of arms pivotally mounted on said rotor adjacent an end thereof, coupling means secured to said arms adjacent the outward ends thereof for driving engagement with a linear element insertable through said rotor, a control member slidably mounted on said rotor, said control member being fabricated at least partially from magnetic material, magnetic means for moving said control member, and means connected to the other ends of said pivoted arms and to said control member for controlling the engagement and disengagement of said coupling means relative to said linearly moving element upon movement of said control member.

9. A linear dynamoelectric machine comprising a supporting member, a stator mounted on said supporting member, an elongated generally tubular rotor mounted for rotational movement on said supporting member at a position adjacent said stator, a plurality of arms, means for pivotally mounting said arms on and longitudinally of said rotor for rotational movement therewith, coupling means secured to one end of each of said arms for driving engagement with a linearly moving element insertable through said rotor, an elongated generally tubular sleeve slidably mounted on said rotor adjacent the other ends of said pivoted arms, said sleeve having a plurality of indents positioned circumferentially about the outer surface thereof, a plurality of tiltable link members individually inserted into said indents and into a second indent formed in an inward surface of each of said pivoted arms adjacent the other end thereof, and means for moving said sleeve.

10. A linear dynamoelectric machine comprising a supporting member, a stator mounted on said supporting member, a tubular rotor mounted for rotational movement on said supporting member at a position adjacent said stator, a plurality of arms, means for pivotally mounting said arms on said rotor for rotational movement therewith, coupling means disposed on one end of each said pivoted arms for drivingly engaging a linearly moving element, a control member slidably mounted on said rotor, said control member being fabricated at least partly from a magnetic material and coupled to each of the other ends of said pivoted arms through a link member, said link member being tiltable to effect movement of said arms and magnetic means for moving said control member to control said tilting and thereby the engagement and disengagement of said coupling means.

11. A linear dynamoelectric machine comprising a supporting member, a stator mounted on said supporting member, a tubular rotor mounted for rotational movement on said supporting member at a position adjacent said stator, a plurality of arms, means for pivotally mounting said arms on said rotor for rotational movement therewith, coupling means disposed on one end of each said pivoted arms for drivingly engaging a linearly moving element, a control member slidably mounted on said rotor and coupled to each of the other ends of said arms through a link member, said link member having a side thereof inserted into one of a pair of indents formed respectively on said control member and on an associated one of said arms and having an opposing portion thereof inserted into the other of said indents, said link member in addition being tiltable to effect movement of said arms, and means for moving said control member to control said tilting and thereby the engagement and disengagement of said coupling means.

12. A linear dynamoelectric machine comprising a supporting member, a stator mounted on said supporting member, a rotor mounted for rotational movement on said supporting member at a position adjacent said stator, a plurality of arms, means for pivotally mounting said arms on said rotor for rotational movement therewith, coupling means disposed on one end of each said pivoted arms for drivingly engaging a linearly moving element, a control member slidably mounted on said rotor and coupled to each of the other ends of said pivoted arms through a link member, the opposing edges of said link member being inserted into juxtaposed grooves formed in said control member and said other ends, respectively, of the pivoted arms, the opposing wall surfaces of said grooves respectively lying in substantially the same plane to define a generally vertical position of said link member relative to said control member and said pivoted arms, said link member being tiltable to and from said vertical position to effect movement of said arms, and means for moving said control member to control said tilting and thereby the engagement and disengagement of said coupling means relative to said linear element.

13. A linear motion producing means having a linearly movable element, said means comprising a tubular support, a plurality of arms, means for pivotally mounting said arms on said support, coupling means disposed on an end of each said pivoted arms for drivingly engaging said linear element, a control member slidably mounted on said support and coupled to each of the other ends of said pivoted arms through a link member, said link member being tiltable to effect movement of said arms, said linear element being inserted through said tubular support, means for moving said control member to control said tilting and thereby the engagement and disengagement of said coupling means relative to said linear element, and means for rotating said tubular support independently of said linear element to impart linear motion to said linear element during said engagement.

14. A linear motion producing means having a linearly movable element, said means comprising a tubular support, a plurality of arms, means for pivotally mounting said arms on said support, coupling means disposed on an end of each said pivoted arms for drivingly engaging said linear element, said linear element being inserted through said support, an elongated tubular control member slidably mounted on said support and coupled at one end thereof to each of the other ends of said pivoted arms through a link member, said link member being tiltable to effect movement of said arms, a generally tubular electromagnet mounted coaxially of said support and juxtaposed to said control element, the other end of said control element terminating in an armature portion fabricated from a magnetic material and disposed coaxially of said electromagnet, said control member being movable by said electromagnet to control said tilting and thereby the engagement and disengagement of said coupling means relative to said linear movement, and means for rotating said tubular support independently of said linear element to impart linear motion thereto during said engagement.

15. A linear dynamoelectric machine comprising a hollow stator, a tubular rotor mounted for rotation within said stator and adapted for the insertion of a linear element, cooperating means mounted on said rotor and said element and engageable for translating rotary motion to linear motion, a tubular control member mounted on said rotor for longitudinal movement relative thereto, means coupled to said control member and to one of said cooperating means for effecting engagement and disengagement thereof upon movement in opposite directions respectively of said control member, and means for moving said control member.

16. A linear dynamoelectric machine comprising a hollow stator, a tubular rotor mounted for rotation within said stator and adapted for the insertion of a linear element, cooperating means mounted on said rotor and said element and engageable for translating rotary motion to linear motion, a tubular control member mounted on said rotor for longitudinal movement relative thereto, means coupled to said control member and to one of said cooperating means for effecting engagement and disengagement thereof upon movement in opposite directions respectively of said control member, and means for moving said control member, said last mentioned means including a generally tubular electromagnet mounted spacedly and coaxially of said rotor, said electromagnet being spaced from said stator, said control member terminating in a tubular armature portion fabricated from a magnetic material and movable with said control member to a position within said electromagnet.

17. A linear motion device comprising a tubular element mounted for rotation and adapted for the insertion of a linear element, means for rotating said tubular element, cooperating means mounted on said tubular element and said linear element and engageable for translating rotary motion to linear motion, a tubular control member mounted for longitudinal movement on said tubular element, means coupled to said control member and to one of said cooperating means for effecting engagement and disengagement thereof upon movement of said control member in opposite directions respectively, and means for moving said control member.

18. A motion translating device comprising a tubular element mounted for at least rotative movement and adapted for the insertion of a linear element, said linear element being at least longitudinally movable with respect to said tubular element, cooperating means mounted on said tubular element and on said linear element and engageable for translating motion from one of said elements to the other of said elements, a tubular control member mounted for longitudinal movement on one of said elements, means coupled to said control member and to one of said cooperating means for effecting engagement and disengagement thereof upon movement of said control member in opposite directions respectively, means for moving said control member and means for moving one of said elements to correspondingly move the other of said elements when said cooperating means are engaged.

References Cited in the file of this patent

UNITED STATES PATENTS

| | | |
|---|---|---|
| 1,241,258 | Hawthorne | Sept. 25, 1917 |
| 2,272,387 | Therrien | Feb. 10, 1942 |
| 2,276,195 | Holmes | Mar. 10, 1942 |
| 2,780,740 | Roman et al. | Feb. 5, 1957 |